Sept. 2, 1969  W. E. ALEXANDER ETAL  3,465,315
LOW TEMPERATURE LIQUID LEVEL INDICATOR
Filed March 28, 1967  2 Sheets-Sheet 1

INVENTORS
WILLIAM E. ALEXANDER
BERNARD C. BOGGS
Harry A. Herbert Jr.
ATTORNEY

Richard J. Killoren
AGENT 3,465,315
LOW TEMPERATURE LIQUID LEVEL INDICATOR
William E. Alexander, Yellow Springs, and Bernard C. Boggs, Springfield, Ohio, assignors to the United States of America as represented by the Secretary of the Air Force
Filed Mar. 28, 1967, Ser. No. 627,254
Int. Cl. G08b *21/00;* G01f *23/00*
U.S. Cl. 340—244                 1 Claim

ABSTRACT OF THE DISCLOSURE

A thermocouple is attached to a thin metal disc which is welded to the end of a protective tube. A heating element is located within the tube adjacent the disc. The heating element is powered by a battery with a switch in the circuit to permit selective energization of the heating element. A temperature indicating device is connected to the output of the thermocouple.

---

The invention described herein may be manufactured and used by or for the United States Government for governmental purposes without the payment to us of any royalty thereon.

Background of the invention

One of the disadvantages in the use of liquid flow systems such as in the use of liquid nitrogen is pump starvation due to loss of liquid from the line. In order to overcome this problem, it is necessary to observe remotely the evacuation of the liquid of cryogenic pipelines in sufficient time to prevent pump starvation.

Summary of the invention

According to this invention a thermocopule is welded to a thin metal disc which acts as the sensing element. The disc is welded to a stainless steel tube to provide a protective jacket. A heating element is positioned within the tube adjacent the thin disc to achieve a fast response to a change in the liquid level.

One object of the invention is to provide a fast response liquid level indicator.

Another object of the invention is to provide a fast response liquid level indicator which may also be used to provide a liquid temperature indication.

These and other objects will be more fully understood from the following detailed description taken with the drawing, wherein:

Description of the preferred embodiment

Figure 1:
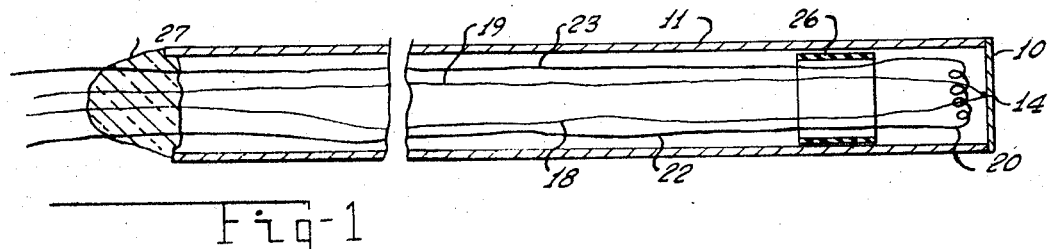
FIG. 1 is a partially schematic sectional view of the cryogenic liquid level-temperature transducer of the invention.
Figure 2:
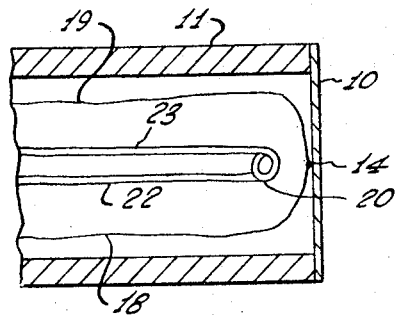
FIG. 2 is an enlarged partially schematic side view of the device of FIG. 1.
Figure 3:
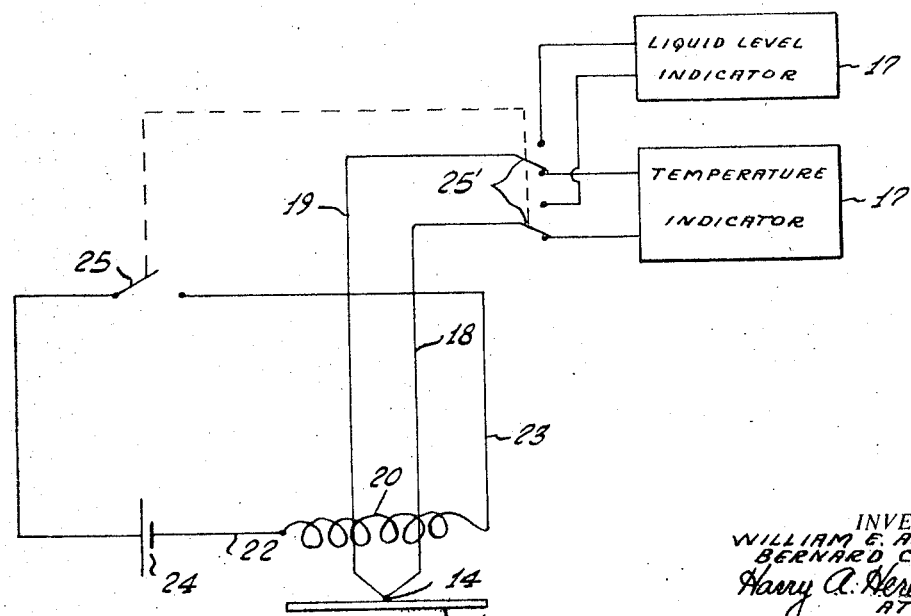
FIG. 3 is a schematic diagram of the circuit for the device of FIG. 1.

Reference is now made to FIG. 1 of the drawing which shows a thin disc 10 of a material, such as Constantan, secured to a protective stainless steel tube 11, by any well-known means such as capacitance welding. A thermocouple indicated at 14 is secured to the center of the disc 10. A thermocouple which has been used, is designated in the I.S.A. Code as an I.S.A.K. thermocouple. The signal from thermocouple 14 is applied by means of leads 18 and 19 to an indicating device 17, such as a light that is turned on when the liquid drops below a predetermined level, as shown in FIG. 3. A heater element 20 is positioned adjacent the disc 10 and has leads 22 and 23 for supplying energy thereto. The leads 22 and 23 connect the heater element 20 to power supply 24 and switch 25. The relative position between the heater element 20 and the disc 10 is maintained by means of binding the leads with a high temperature tape 26. The leads are sealed at the opposite end of tube 11 by means of an insulator 27 such as a silicone rubber.

Figure 4A:
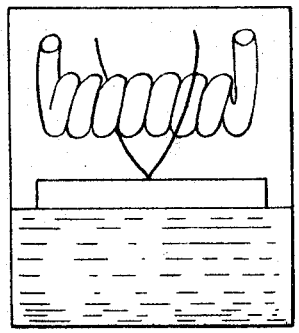
FIG. 4A is a schematic illustration of the liquid level-temperature transducer of FIG. 1 with the liquid in contact with the metal foil.
Figure 4C:
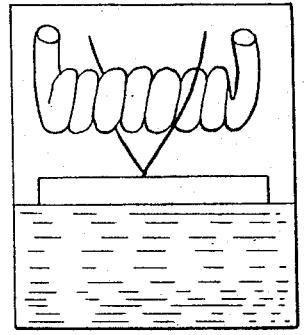
FIG. 4C is a schematic illustration of the device of FIG. 1 when the liquid again rises to contact the metal foil.
Figure 4B:
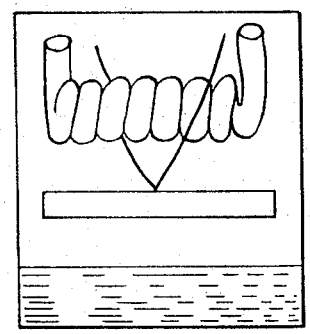
FIG. 4B is a schematic illustration of the device of FIG. 1 as the liquid recedes from the metal foil.
Figure 5:
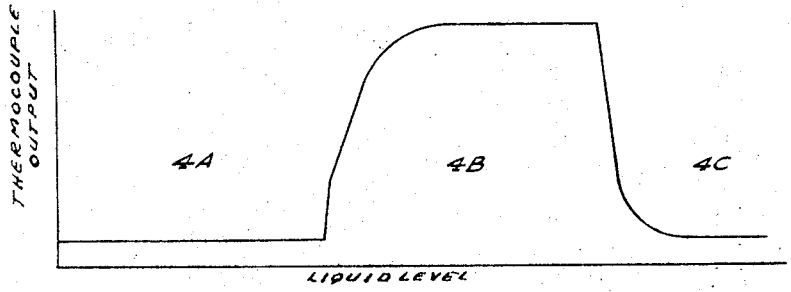
FIG. 5 shows the measured temperature of the foil as a function of liquid position as illustrated in FIGS. 4A, 4B and 4C.

In the operation for the device, the switch may be left open so that the heat is not energized and the indicator can be used to provide a liquid temperature indication on an indicator 17'. When it is desired to use the device as a liquid level indicator, switch 25 is closed to energize the heater 20 and switch 25' is switched to connect indicator 17 to the thermocouple 14. Under these conditions with the liquid such as liquid nitrogen in contact with the disc 10 as shown in FIG. 4A, the liquid acts as a heat sink and the temperature indication will be as shown at 4A in FIG. 5. As the liquid level recedes from the disc 10 the temperature of the disc rises rapidly as shown at 4B in FIG. 5. When the liquid level again returns to where it contacts the disc 10 the disc temperature rapidly drops to the lower level as shown at 4C in FIG. 5.

To measure temperature, the switch 25 is opened and switch 25' is moved to connect temperature indicator 17' to the output of the thermocouple. For some applications, switch 25' can be omitted with the two indicators being connected in parallel.

While the output of the thermocouple is shown as being connected to device 17 to indicate liquid level, it could also be used to control the operation of a pump or to shut down the system to prevent damage when the liquid level drops below a desirable level.

There is thus provided a fast response liquid level indicator which may also be used to provide a liquid temperature indication.

While a specific embodiment has been described, it is obvious that numerous changes may be made without departing from the general principles and scope of the invention.

We claim:

1. A device for determining when a low temperature liquid drops below a predetermined level comprising: an elongated tubular member, a thin metal disc sealed to one end of said tubular member; said disc having an external surface adapted to contact said liquid to be cooled thereby; means, secured to said disc for sensing the temperature of said disc; indicating means connected to the output of said temperature sensing means; and means within said tubular member for supplying heat to said disc.

(References on following page)

References Cited

"Measurement of Surface Temperatures I–A Portable Thermocouple Device Compensated for Heat Losses," by M. W. Boyer and J. Buss; an article found on pp. 728 and 729 of "Industrial and Engineering Chemistry," vol. 18, No. 7.

LOUIS R. PRINCE, Primary Examiner

DENIS E. CORR, Assistant Examiner

U.S. Cl. X.R.

73—295, 344, 359